US008606223B1

(12) United States Patent
Lekutai et al.

(10) Patent No.: US 8,606,223 B1
(45) Date of Patent: Dec. 10, 2013

(54) GROUP INFORMATION AND COMPONENTS FOR WIRELESS DEVICES

(75) Inventors: Gaviphat Lekutai, Kirkland, WA (US); Coulter C. Henry, Jr., Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 873 days.

(21) Appl. No.: 11/697,865

(22) Filed: Apr. 9, 2007

(51) Int. Cl.
*H04M 11/00* (2006.01)
*H04M 15/00* (2006.01)

(52) U.S. Cl.
USPC ............... 455/406; 379/114.26; 379/114.28

(58) Field of Classification Search
USPC ............ 455/436–439, 403–422.1, 463, 455/518–520, 550.1–575.9; 379/114.01–132, 88.19, 88.2, 88.21, 379/112.06–141, 142.04, 142.11, 379/201.01–218.02; 705/40, 14.7, 26.35, 705/20, 402, 50–79, 14.25, 14.64, 14.66, 705/34, 35, 36 R, 400, 409; 370/310.2, 328, 370/338, 352–356, 10.2; 725/1–22
See application file for complete search history.

(56) References Cited

U.S. PATENT DOCUMENTS 6,018,668 A * 1/2000 Schmidt ..................... 455/518
6,078,805 A * 6/2000 Scott ........................... 455/406
6,173,171 B1 * 1/2001 Plush et al. .................. 455/408
7,260,195 B1 * 8/2007 Elman et al. ................. 379/126
7,827,402 B2 * 11/2010 Smith .......................... 713/160
2002/0136226 A1 * 9/2002 Christoffel et al. ......... 370/401
2004/0209595 A1 * 10/2004 Bekanich ..................... 455/405
2005/0069112 A1 * 3/2005 Hlasny ........................ 379/126
2005/0101314 A1 * 5/2005 Levi ............................ 455/423
2008/0159500 A1 * 7/2008 Wang ....................... 379/142.05

FOREIGN PATENT DOCUMENTS

WO    WO 2005122600 A1 * 12/2005    ............ H04Q 7/00

OTHER PUBLICATIONS

"Let no network come between you," T-Mobile, 2002-2006, 2 pages, http://www.t-mobile.com/promotions/onlineoffer2.aspx?PAsset=Pro_Pro_myFavesSingle, downloaded from the internet on Jun. 6, 2007.

* cited by examiner

*Primary Examiner* — San Htun
(74) *Attorney, Agent, or Firm* — Woodcock Washburn LLP

(57) ABSTRACT

A group billing component may be adapted to determine whether a source wireless device and a destination wireless device may be members of a group. The group billing component may receive a group identifier, a destination device identifier, and a source device identifier from the source wireless upon initiating communication with the destination wireless device. The group billing component may compare the destination device identifier with a group list that may be indexed by the group identifier. Based on the comparison, the group billing component may determine whether to output a usage fee to a subscriber of the source wireless device. The usage fee may be output if at least one element in the group list does not match the destination device identifier.

17 Claims, 7 Drawing Sheets

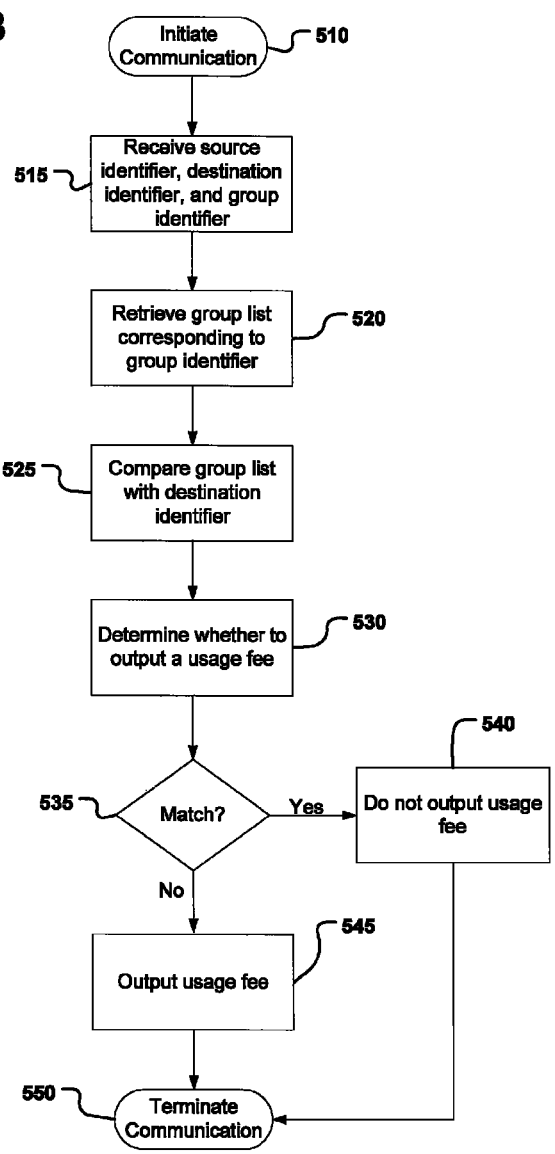

GROUP INFORMATION AND COMPONENTS FOR WIRELESS DEVICES

BACKGROUND

Today, cellular telephones have become one of the most popular ways of communicating with others, because of their mobility, convenience and ease of use. In fact, in every crowd, there may be someone talking on his or her cellular telephone.

Frequently, a cellular telephone subscriber (or the user of any type of wireless device) may subscribe to a particular rate plan for a monthly fee. For example, the subscriber may pay a monthly fee for a set number of minutes the subscriber may use to talk to others. The rate plan may also include additional benefits per month that may be included in the monthly fee or for additional fees. Such benefits may include unlimited minutes to other subscribers of the same wireless network provider, text messaging capabilities, instant messaging capabilities, media capabilities, and the like.

Unfortunately, many subscribers may use different wireless network providers which may reduce the marketability of such benefits. For example, unlimited minutes to other subscribers of the same network may not be as marketable to some wireless device subscribers, because their family and friends may be on different wireless network providers. Additionally, some benefits, such as allowing a user of a wireless device unlimited minutes, text messaging, or the like, to a specific number even if that number is not part of its in-network may not be flexible enough for a subscriber's needs.

SUMMARY

In view of the above shortcomings and drawbacks, methods and systems are provided that determine whether a source wireless device and a destination wireless device belong to a group. According to an example embodiment, a method of determining whether a source wireless device and a destination wireless device belong to a group may include receiving a source device identifier, a destination device identifier, and a group identifier and retrieving a group list corresponding to the group identifier. The method may further include comparing the group list with the destination device identifier and determining whether to output a usage fee for a source wireless device subscriber based on the comparison. According to one embodiment, the usage fee may output if at least one element in the group list does not match the destination device identifier.

In another example embodiment, a group billing component within a wireless communication network for determining whether a source wireless device and a destination wireless device belong to a group includes a device information module. The device information module may receive a group identifier, a source device identifier, and a destination device identifier from the source wireless device. The group billing component may further include a group module. The group module may be adapted to store information for determining whether the source wireless device and the destination wireless device belong to the group. The group module may include a group list corresponding to the group identifier. The group billing component may also include a group processor component in operative communication with the device information module and the group module. According to one embodiment, the group processor component may compare the device identifier with at least one element in the group list. If at least one element in the group list does not match the device identifier, the group processor component may output a usage fee for a subscriber corresponding to the source device identifier.

According to another example embodiment, a wireless device may be provided that may be used in connection with the group billing component. The wireless device may include memory. The memory may store information relating to the wireless device including a source device identifier and a destination device identifier. In one embodiment, the wireless device may include a wireless communication module that may initiate a communication by transmitting the source device identifier and the destination device identifier to a communication network. The wireless device may also include a user interface module that may permit user interaction with the wireless device and a group identification module. The group identification module may receive a group identifier that may indicate a group of which the wireless device may be a member.

BRIEF DESCRIPTION OF THE DRAWINGS

FIG. 3 depicts an example method of determining whether wireless devices belongs to a group according to one embodiment.

DETAILED DESCRIPTION

Figure 1A:
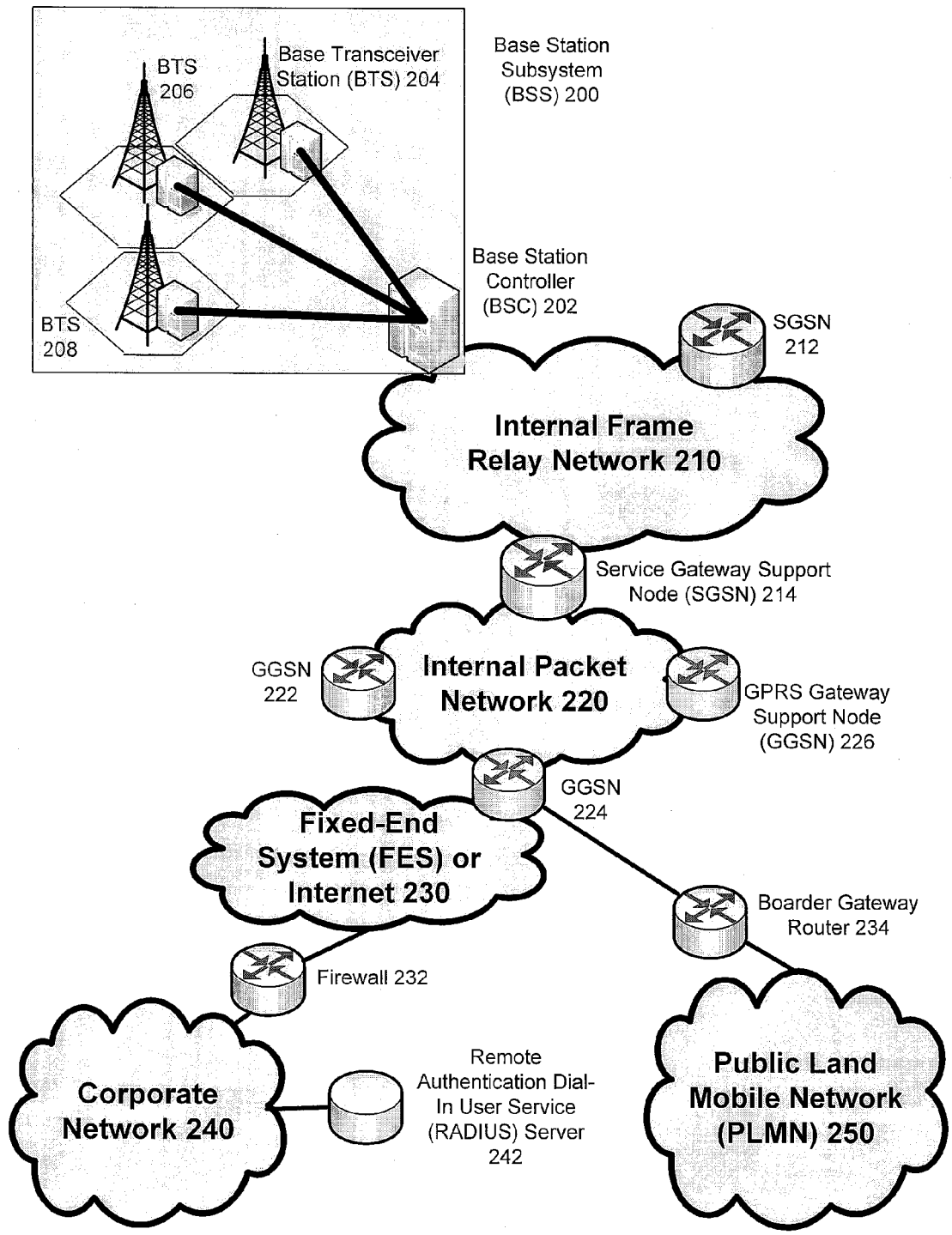
FIG. 1A illustrates an overview of a network environment in which aspects of an embodiment may be implemented.

The subject matter of the disclosed embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The embodiments disclosed herein allow a person to use a wireless device to communicate with other wireless devices without incurring usage fees. For example, a user of a source wireless device may initiate a communication with a user of a destination wireless device. The user of the destination wireless device may or may not be a subscriber to a rate plan provided by a source network provider to which the user of the source wireless device may belong. But, the user of the source wireless device may not incur a usage fee to communicate with the user of the destination wireless device if both the source wireless device and the destination wireless device belong to the same group. Thus, regardless of a network provider, systems and methods may be employed to provide communication between wireless devices that belong to the same group without incurring usage fees.

In the discussion that follows, details relating to wireless devices and networks are assumed to be known to those skilled in the art. Accordingly, such details are largely omitted herein for the sake of clarity and explanation. In addition, any references herein to an example embodiment involving a cellular telephone is solely for purposes of explanation, and is not intended to limit the invention to any such embodiment. For example, a wireless device as contemplated by various embodiments of the invention may include, but are not limited to: cellular telephones, personal digital assistants (PDAs), email devices and the like. The wireless device may operate in a cellular, SMR, PCS, cordless, unlicensed AWS, 700 MHz, or other spectrums. Furthermore, embodiments are not limited by the network servicing the device. Accordingly, embodiments may be applicable to any network type including, for example, TDMA, CDMA, WCDMA, GSM, WiFi, WiMAX, OFDM, UMTS, EV-DO, HSDPA/HSUPA and other standards now known or to be developed in the future.

Example Network and Operating Environments

The following description sets forth some example telephony radio networks and non-limiting operating environments in which users of various groups may call each other without additional charges according to the example embodiments. The below-described operating environments should be considered non-exhaustive, however, and thus the below-described network architecture merely shows an example network architecture in which aspects of various embodiments may be incorporated. One can appreciate, however, that aspects of an embodiment may be incorporated into now existing or future alternative architectures for communication networks.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

FIG. 1A depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 200 (only one is shown in FIG. 1A), each of which comprises a Base Station Controller ("BSC") 202 serving a plurality of Base Transceiver Stations ("BTS") such as, for example, BTSs 204, 206 and 208. BTSs 204, 206, 208, etc., are the access points where users of packet-based mobile devices become connected to the wireless network. In one embodiment, the packet traffic originating from user devices is transported over the air interface to BTS 208, and from BTS 208 to BSC 202. Base station subsystems, such as BSS 200, may be a part of internal frame relay network 210 that may include Service GPRS Support Nodes ("SGSN") such as SGSN 212 and 214. Each SGSN 212, 214, etc. is in turn connected to internal packet network 220 through which SGSN 212, 214, etc. can route data packets to and from a plurality of gateway GPRS support nodes (GGSN) 222, 224, 226, etc. As illustrated, SGSN 214 and GGSNs 222, 224 and 226 are part of internal packet network 220. Gateway GPRS serving nodes 222, 224 and 226 may provide an interface to external Internet Protocol ("IP") networks such as Public Land Mobile Network ("PLMN") 250, corporate intranets 240, Fixed-End System ("FES"), the public Internet 230 or the like. As illustrated, subscriber corporate network 240 may be connected to GGSN 224 via firewall 232; and PLMN 250 may be connected to GGSN 224 via boarder gateway router 234. Remote Authentication Dial-In User Service ("RADIUS") server 242 may be used for caller authentication when a user of a mobile cellular device calls corporate network 240, for example.

Generally, there can be four different cell sizes in a GSM network—macro, micro, pico and umbrella cells. The coverage area of each cell is different in different environments. Macro cells may be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Figure 1B:
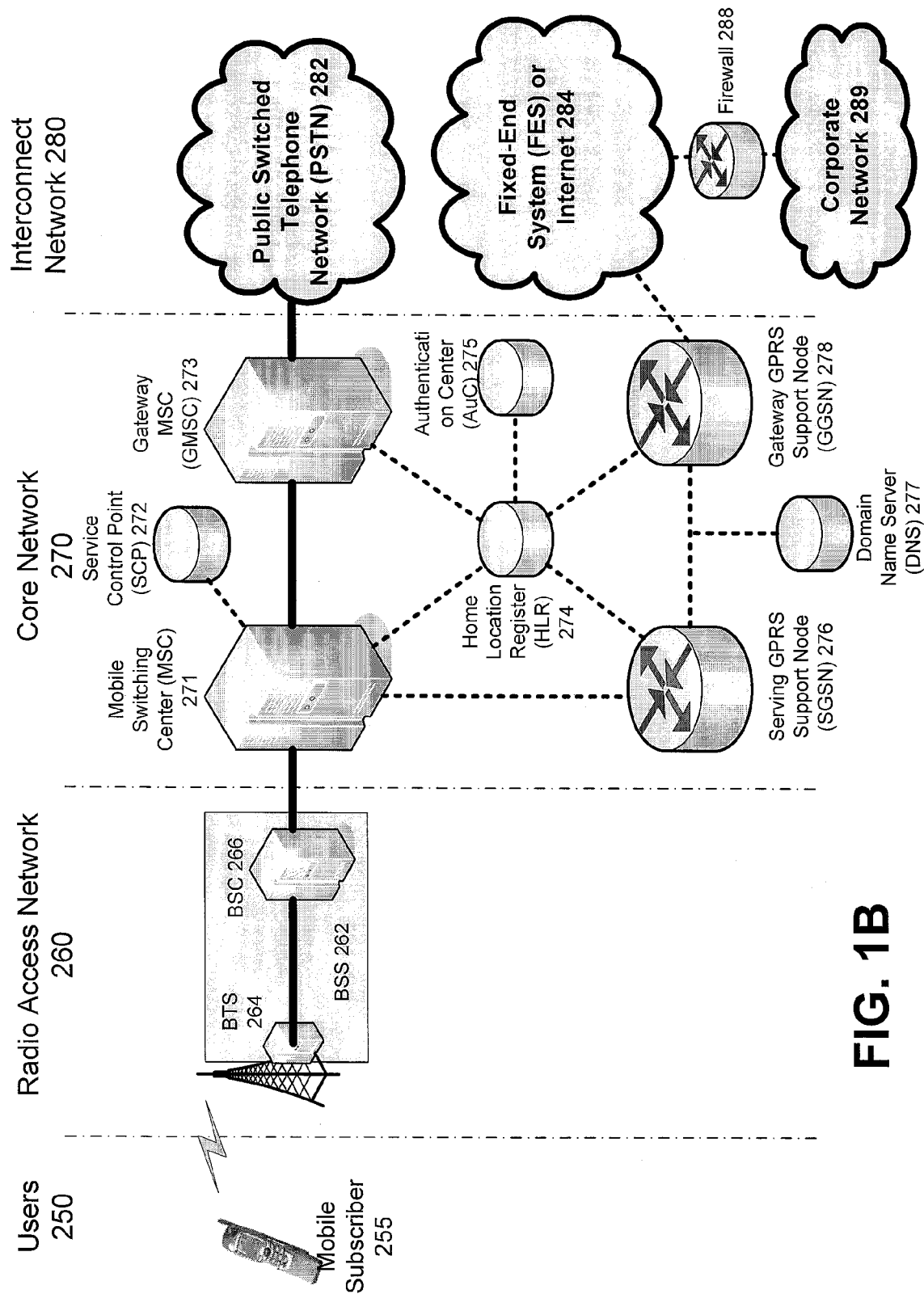
FIG. 1B illustrates a GPRS network architecture in which aspects of an embodiment may be implemented.

FIG. 1B illustrates the architecture of a typical GPRS network as segmented into four groups: users 250, radio access network 260, core network 270 and interconnect network 280. Users 250 comprise a plurality of end users (though only mobile subscriber 255 is shown in FIG. 7B). Radio access network 260 comprises a plurality of base station subsystems such as BSSs 262, which include BTSs 264 and BSCs 266. Core network 270 comprises a host of various network elements. As illustrated here, core network 270 may comprise Mobile Switching Center ("MSC") 271, Service Control Point ("SCP") 272, gateway MSC 273, SGSN 276, Home Location Register ("HLR") 274, Authentication Center ("AuC") 275, Domain Name Server ("DNS") 277 and GGSN 278. Interconnect network 280 also comprises a host of various networks and other network elements. As illustrated in FIG. 1B, interconnect network 280 comprises Public Switched Telephone Network ("PSTN") 282, Fixed-End System ("FES") or Internet 284, firewall 288 and Corporate Network 289.

A mobile switching center may be connected to a large number of base station controllers. At MSC 271, for example, depending on the type of traffic, the traffic may be separated such that voice may be sent to Public Switched Telephone Network ("PSTN") 282 through Gateway MSC ("GMSC") 273, and/or data may be sent to SGSN 276, which then sends the data traffic to GGSN 278 for further forwarding.

When MSC 271 receives call traffic, for example, from BSC 266, it may send a query to a database hosted by SCP 272. The SCP 272 processes the request and issues a response to MSC 271 so that it may continue call processing as appropriate.

HLR 274 is a centralized database for users to register to the GPRS network. HLR 274 stores static information about the subscribers such as the International Mobile Subscriber Identity ("IMSI"), subscribed services, and a key for authenticating the subscriber. HLR 274 also stores dynamic subscriber information such as the current location of the mobile subscriber. Associated with HLR 274 may be AuC 275. AuC 275 is a database that contains the algorithms for authenticating subscribers and includes the associated keys for encryption to safeguard the user input for authentication.

In the following, depending on context, the term "mobile subscriber" may refer to either the end user or to the actual portable device used by an end user of the mobile cellular service. When a mobile subscriber turns on his or her mobile device, the mobile device goes through an attach process by which the mobile device attaches to an SGSN of the GPRS network. Referring now to FIG. 1B, when mobile subscriber 255 initiates the attach process by turning on the network capabilities of the mobile device, an attach request is sent by mobile subscriber 255 to SGSN 276. The SGSN 276 queries another SGSN, to which mobile subscriber 255 was attached before, for the identity of mobile subscriber 255. Upon receiving the identity of mobile subscriber 255 from the other SGSN, SGSN 276 requests more information from mobile subscriber 255. This information is used to authenticate mobile subscriber 255 to SGSN 276 by HLR 274. Once verified, SGSN 276 sends a location update to HLR 274 indicating the change of location to a new SGSN, in this case SGSN 276. HLR 274 notifies the old SGSN, to which mobile subscriber 255 was attached, to cancel the location process for mobile subscriber 255. HLR 274 then notifies SGSN 276 that the location update has been performed. At this time, SGSN 276 sends an Attach Accept message to mobile subscriber 255, which in turn sends an Attach Complete message to SGSN 276.

After attaching itself with the network, mobile subscriber 255 then goes through the authentication process. In the authentication process, SGSN 276 sends the authentication information to HLR 274, which sends information back to SGSN 276 based on the user profile that was part of the user's initial setup. SGSN 276 then sends a request for authentication and ciphering to mobile subscriber 255. Mobile subscriber 255 uses an algorithm to send the user identification (ID) and password to SGSN 276. SGSN 276 uses the same algorithm and compares the result. If a match occurs, SGSN 276 authenticates mobile subscriber 255.

Next, mobile subscriber 255 establishes a user session with the destination network, corporate network 289, by going through a Packet Data Protocol ("PDP") activation process. Briefly, in the process, mobile subscriber 255 requests access to the Access Point Name ("APN"), for example, UPS.com (e.g., which can be corporate network 279) and SGSN 276 receives the activation request from mobile subscriber 255. SGSN 276 then initiates a Domain Name Service ("DNS") query to learn which GGSN node has access to the UPS.com APN. The DNS query is sent to the DNS server within the core network 270, such as DNS 277, which is provisioned to map to one or more GGSN nodes in the core network 270. Based on the APN, the mapped GGSN 278 can access the requested corporate network 279. The SGSN 276 then sends to GGSN 278 a Create Packet Data Protocol ("PDP") Context Request message that contains necessary information. The GGSN 278 sends a Create PDP Context Response message to SGSN 276, which then sends an Activate PDP Context Accept message to mobile subscriber 255.

Once activated, data packets of the call made by mobile subscriber 255 can then go through radio access network 260, core network 270, and interconnect network 280, in particular fixed-end system or Internet 284 and firewall 288, to reach corporate network 289. Thus, network elements that may implicate the functionality of the service delivery based on real-time performance requirement(s) in accordance with an embodiment may include but are not limited to Gateway GPRS Support Node tables, Fixed End System router tables, firewall systems, VPN tunnels and any number of other network elements as required by the particular digital network.

Figure 1C:
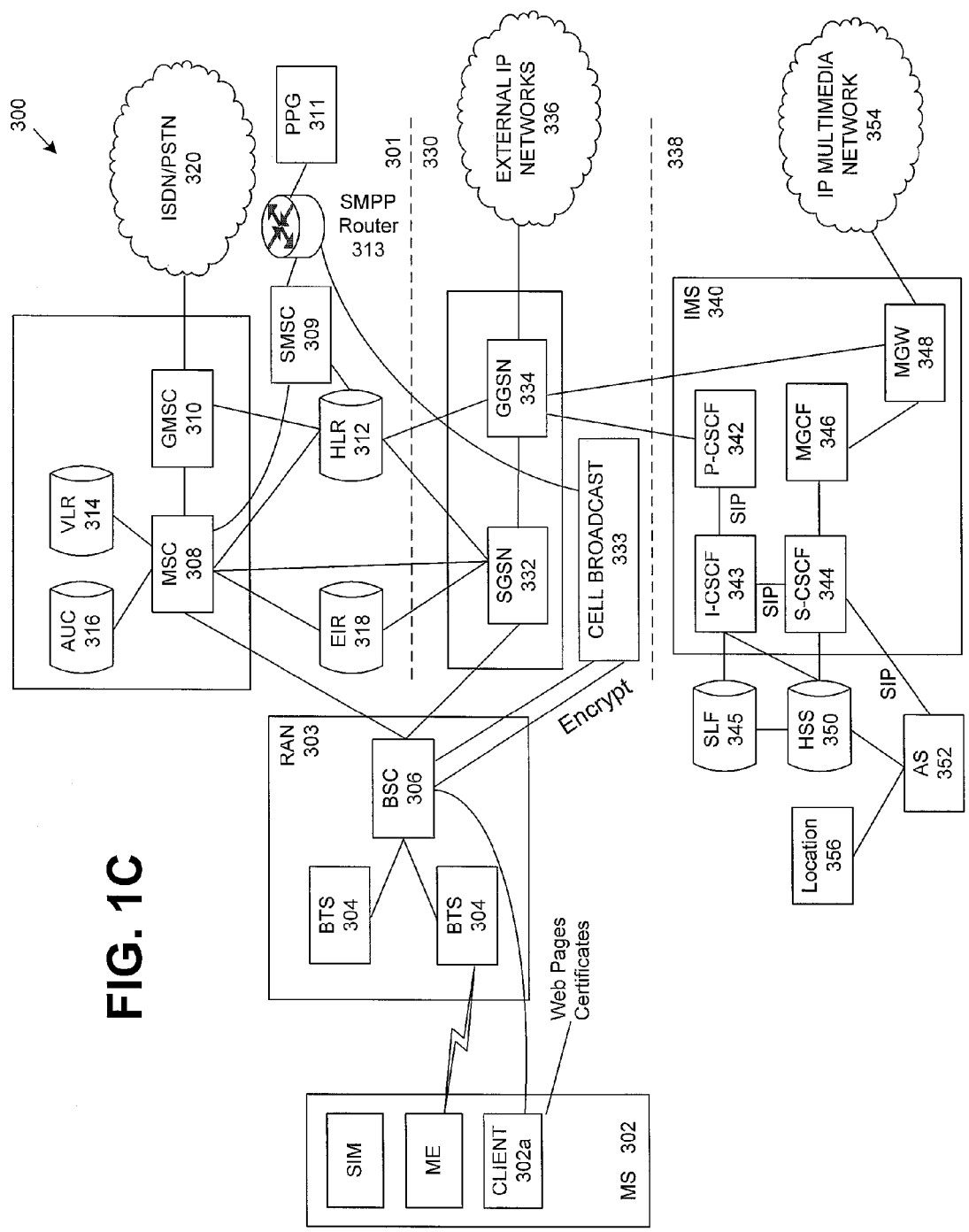
FIG. 1C illustrates an alternate block diagram of an example GSM/GPRS/IP multimedia network architecture in which aspects of an embodiment may be implemented.

FIG. 1C shows another example block diagram view of a GSM/GPRS/IP multimedia network architecture 300 in which the apparatus and methods for transferring multimedia content between receiving devices of the below-discussed embodiments may be incorporated. As illustrated, architecture 300 of FIG. 1C includes GSM core network 301, GPRS network 330 and IP multimedia network 338. GSM core network 301 includes Mobile Station (MS) 302, at least one Base Transceiver Station (BTS) 304 and Base Station Controller (BSC) 306. MS 302 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. BTS 304 is physical equipment, such as a radio tower, that enables a radio interface to communicate with the MS. Each BTS may serve more than one MS. BSC 306 manages radio resources, including the BTS. The BSC may be connected to several BTSs. The BSC and BTS components, in combination, are generally referred to as a base station (BSS) or radio access network (RAN) 303.

GSM core network 301 also includes Mobile Switching Center (MSC) 308, Gateway Mobile Switching Center (GMSC) 310, Home Location Register (HLR) 312, Visitor Location Register (VLR) 314, Authentication Center (AuC) 318 and Equipment Identity Register (EIR) 316. MSC 308 performs a switching function for the network. The MSC also performs other functions, such as registration, authentication, location updating, handovers and call routing. GMSC 310 provides a gateway between the GSM network and other networks, such as an Integrated Services Digital Network (ISDN) or Public Switched Telephone Networks (PSTNs) 320. In other words, GMSC 310 provides interworking functionality with external networks.

HLR 312 is a database that contains administrative information regarding each subscriber registered in a corresponding GSM network. HLR 312 also contains the current location of each MS. VLR 314 is a database that contains selected administrative information from HLR 312. The VLR contains information necessary for call control and provision of subscribed services for each MS currently located in a geographical area controlled by the VLR. HLR 312 and VLR 314, together with MSC 308, provide the call routing and roaming capabilities of GSM. AuC 316 provides the parameters needed for authentication and encryption functions. Such parameters allow verification of a subscriber's identity. EIR 318 stores security-sensitive information about the mobile equipment.

Short Message Service Center (SMSC) 309 allows one-to-one Short Message Service (SMS) messages to be sent to/from MS 302. Push Proxy Gateway (PPG) 311 is used to "push" (i.e., send without a synchronous request) content to MS 102. PPG 311 acts as a proxy between wired and wireless networks to facilitate pushing of data to MS 302. Short Message Peer to Peer (SMPP) protocol router 313 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. MS 302 sends a location update including its current location information to the MSC/VLR, via BTS 304 and BSC 306. The location information is then sent to the MS's HLR. The HLR is updated with the location information received from the MSC/VLR. The location update also is performed when the MS moves to a new location area. Typically, the location update is periodically performed to update the database as location updating events occur.

GPRS network 330 is logically implemented on the GSM core network architecture by introducing two packet-switching network nodes, a serving GPRS support node (SGSN) 332, a cell broadcast and a Gateway GPRS support node (GGSN) 334. SGSN 332 is at the same hierarchical level as MSC 308 in the GSM network. The SGSN controls the connection between the GPRS network and MS 302. The SGSN also keeps track of individual MS's locations and security functions and access controls.

Cell Broadcast Center (CBC) 333 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

GGSN 334 provides a gateway between the GPRS network and a public packet network (PDN) or other IP networks 336. That is, the GGSN provides interworking functionality with external networks, and sets up a logical link to the MS through the SGSN. When packet-switched data leaves the GPRS network, it is transferred to external TCP-IP network 336, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

IP multimedia network 338 was introduced with 3GPP Release 5, and includes IP multimedia subsystem (IMS) 340 to provide rich multimedia services to end users. A representative set of the network entities within IMS 340 are a call/session control function (CSCF), media gateway control function (MGCF) 346, media gateway (MGW) 348, and a master subscriber database, referred to as a home subscriber server (HSS) 350. HSS 350 may be common to GSM network 301, GPRS network 330 as well as IP multimedia network 338.

IP multimedia system 340 is built around the call/session control function, of which there are three types: interrogating CSCF (I-CSCF) 343, proxy CSCF (P-CSCF) 342 and serving CSCF (S-CSCF) 344. P-CSCF 342 is the MS's first point of contact with IMS 340. P-CSCF 342 forwards session initiation protocol (SIP) messages received from the MS to an SIP server in a home network (and vice versa) of the MS. P-CSCF 342 may also modify an outgoing request according to a set of rules defined by the network operator (for example, address analysis and potential modification).

I-CSCF 343 forms an entrance to a home network and hides the inner topology of the home network from other networks and provides flexibility for selecting an S-CSCF. I-CSCF 343 may contact subscriber location function (SLF) 345 to determine which HSS 350 to use for the particular subscriber, if multiple HSSs 350 are present. S-CSCF 344 performs the session control services for MS 302. This includes routing originating sessions to external networks and routing terminating sessions to visited networks. S-CSCF 344 also decides whether application server (AS) 352 is required to receive information on an incoming SIP session request to ensure appropriate service handling. This decision is based on information received from HSS 350 (or other sources, such as application server 352). AS 352 also communicates to location server 356 (e.g., a Gateway Mobile Location Center (GMLC)) that provides a position (e.g., latitude/longitude coordinates) of MS 302.

HSS 350 contains a subscriber profile and keeps track of which core network node is currently handling the subscriber. It also supports subscriber authentication and authorization functions (AAA). In networks with more than one HSS 350, a subscriber location function provides information on HSS 350 that contains the profile of a given subscriber. The MGCF 346 provides interworking functionality between SIP session control signaling from IMS 340 and ISUP/BICC call control signaling from the external GSTN networks (not shown). It also controls media gateway (MGW) 348 that provides user-plane interworking functionality (e.g., converting between AMR- and PCM-coded voice). MGW 348 also communicates with other IP multimedia networks 354.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, may not indicate the actual physical location of the mobile phones outside the pre-defined area.

Example Embodiments of Systems and Methods

Figure 2A:
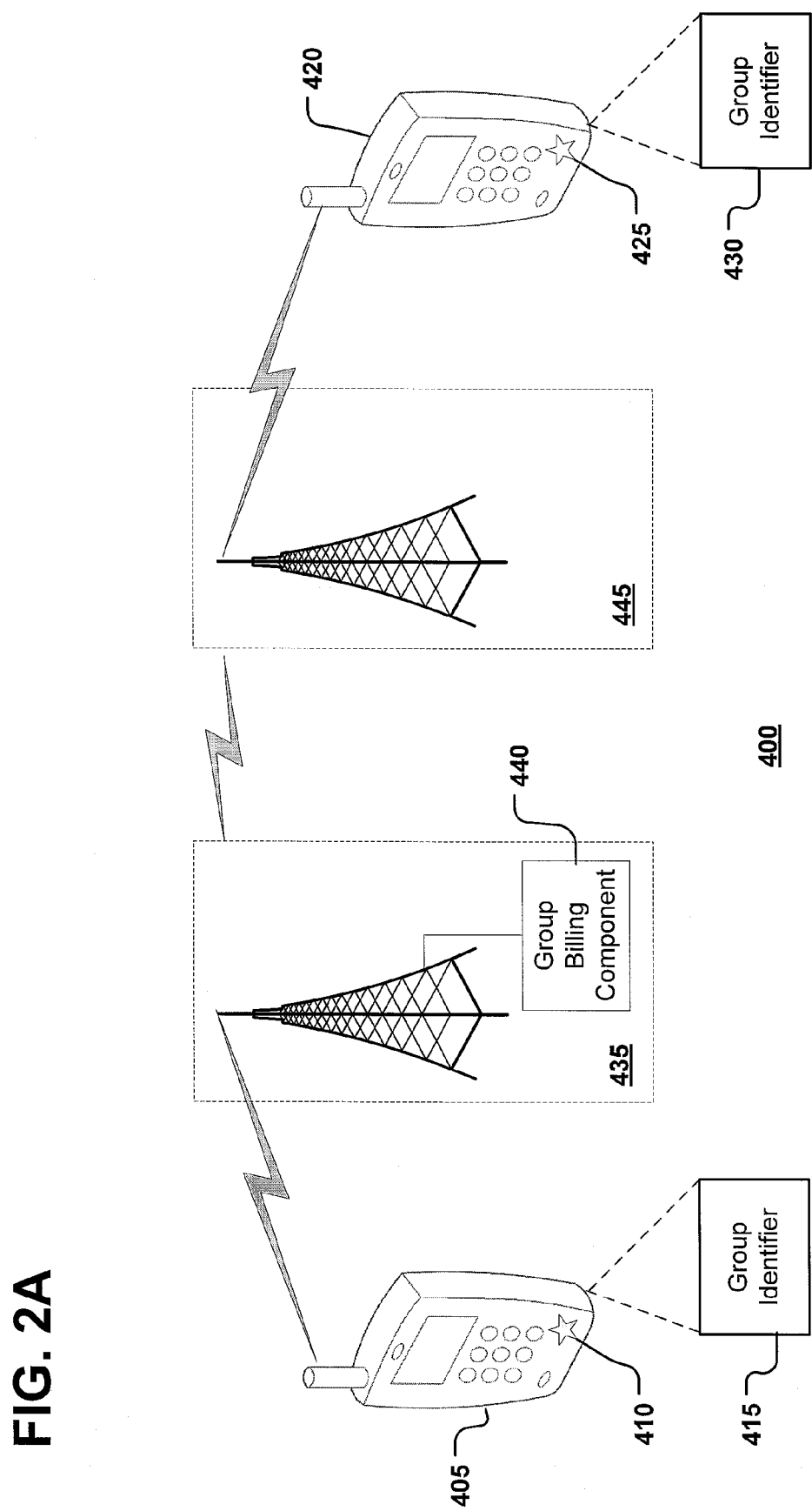
FIG. 2A depicts a diagram illustrating an example configuration of wireless devices in communication with communication networks in accordance with one embodiment.

FIG. 2A is a diagram illustrating an example configuration 400 of source wireless device 405 in communication with destination wireless device 420 in accordance with an embodiment. It will be appreciated that the source and destination designations for source wireless device 405 and destination wireless device 420 are illustrative, and may be switched. According to one embodiment, source wireless device 405 may communicate with destination wireless device 420 using, for example, source communication network 435 and destination communication network 445. Source communication network 435 may include group billing component 440. Source communication network 435, including group billing component 440, and destination communication network 445 will be described in more detail below.

As can be seen in FIG. 2A, source wireless device 405 and destination wireless device 420 may include, for example, a housing, a plurality of input keys, an antenna, a display screen, and/or any other suitable hardware and software components, which will be described in more detail below. Source wireless device 405 and destination wireless device 420 may include group identification symbols 410 and 425, respectively. Group identification symbols 410 and 425 may include domino patterns, graphics, logos, icons, or the like such that group identifications symbols 410 and 425 may pictorially represent a group to which source wireless device 405 and destination wireless device 420 may belong, for example. In an embodiment, group identification symbols 410 and 425 may correspond to group identifiers 415 and 430. Group identifiers 415 and 430 may include digital information such as numerical and/or character representations of the group to which source wireless device 405 and destination wireless device 420 may belong, which will be described in more detail below.

According to one embodiment, the group to which source wireless device 405 and/or destination wireless device 420 may belong may include a global category, a purpose category, a temporary category, or the like. For example, the group may include a global category such as all wireless devices that may include a group identifier with a corresponding group identification symbol such as a pattern of two domino dots. The group may also include a plurality of global categories. For example, the group may include two sets of domino patterns to appear like a typical domino. Thus, a wireless device may communicate without incurring a usage fee with all wireless devices in both pictorial patterns such as a two domino dot pattern being the first global group and a four domino dot pattern being the second global group. Thus, according to one embodiment, the wireless device, such as source wireless device 405 and/or destination wireless device 420, may belong to more than one global categories.

According to an alternative embodiment, the group may include a purpose category. The purpose category may include, for example, a set of wireless devices that may be rented and may communicate with each other without incurring a usage fee. For example, a family may rent a set of wireless devices for each of its members for a rental fee or according to a rental rate plan. In such an embodiment, source wireless device 405 and/or destination wireless device 420 may not need group identification symbols 410 and 425, respectively. These wireless devices may communicate with each other without incurring a usage fee. For example, the wireless devices may be programmed to only communicate with a predetermined set of numbers such that a communication may be denied if it is made to a number outside the predetermined set. Alternatively, the wireless devices may communicate with wireless devices outside of the group, but those communications may result in a usage fee.

The group may also include a temporary category according to an embodiment. The temporary category may include an ad hoc group, or the like. For example, the temporary category may be a group defined for a specific purpose such as, but not limited to, a business conference, a weekend sporting event, or the like. While at the conference or event, the subscriber may use his or her wireless device to communicate with other members at the conference without incurring a usage fee. Additionally, the subscriber may be able to collect digital information from other participants at the conference or event, such as business cards, without incurring a usage fee. Once the conference or temporary time period is over, the temporary category may be discontinued and usage fees may be incurred for communication to those wireless devices.

Additionally, a group may be divided into sub-categories or sub-groups. For example, and as was described above, a particular school district may be designated as a global category. Thus, all subscribers or users of wireless devices may have a group identifier designating at least one of their global categories as that particular school district. But, that global category may also be divided into subcategories or sub-groups such as the PTO, soccer association, or the like within that school district.

According to one embodiment, the number of groups of which a subscriber may be a member of may be dependent upon a subscriber's rate plan. For example, the subscriber may be allowed to be a member of a predetermine, or fixed, number of sub-groups. Thus, the subscriber may be allowed to communicate with subscribers in those sub-groups without additional usage fees, but may incur usage fees such as minute deductions, text message fees, or the like out of the subscriber's rate plan to those outside the sub-group.

As described above, source wireless device 405 and destination wireless device 420 may also include group identifiers 415 and 430 stored therein, respectively. Group identifier 415 and 430 may correspond to group identification symbols 410 and 425 in an example embodiment. For example, the pictorial representations defined by group identification symbol 410 and 425 may be tied to group identifiers 415 and 430, respectively such that, if group identification symbol 410 does not match group identification symbol 425, then group identifiers 415 and 430 do not match, and therefore, source wireless device 405 and destination wireless device 420 do not belong to the same group. As described above, group identification symbols 410 and 425 may include domino patterns, graphics, logos, icons, or the like such that group identifications symbols 410 and 425 may pictorially represent a group to which source wireless device 405 and destination wireless device 420 may belong, for example. According to one embodiment, group identifiers 415 and 430 may include any type of information that may be used by a communication network and/or network provider to identify a group to which wireless devices may belong. For example, group identifiers 415 and 430 may include digital information such as number and/or character sequences stored in source wireless device 405 and destination wireless device 420.

According to one embodiment, group identifiers 415 and 430 may include the International Mobile Equipment Identity (IMEI) of source wireless device 405 and destination wireless device 420, respectively. The IMEI may be a numerical value unique to each wireless device. Typically, the IMEI number may be used by the network such as source communication network 435 and/or destination communication network 445 to identify whether a wireless device may be valid and, thus, may access the network. According to one embodiment, the IMEI may be a fifteen and/or seventeen digit set of characters such as numbers or letters that may designate the origin, model, serial number, or the like of the wireless device. For example, the format of the IMEI may include a sequence such as AA-BBBBBB-CCCCCC-D or AA-BBBBBB-CCCCCC-D-EE, where certain digits may represent information pertaining to the wireless device. The entire set of digits encompassing the IMEI or a portion thereof may be used to identify a group to which source wireless device 405 and/or destination wireless device 420 may belong, which will be described in more detail below.

Additionally, group identifiers 415 and 430 may include the account number or information associated with the Subscriber Identity Module (SIM) that may be included in source wireless device 405 and destination wireless device 420 according to an example embodiment. For example, source wireless device 405 and destination wireless device 420 may include a SIM card therein. The SIM card may store information to authenticate and identify a subscriber on source communication network 435 and/or destination communication network 445. For example, the SIM card may store information relating to a subscriber's account with the network provider such as an International Mobile Subscriber Identity (IMSI), an International Circuit Card ID (ICCID), or the like. The ICCID may include any combination of characters such as numbers and/or letters, that may be used to identify the SIM card. Similarly, the IMSI may include any combination of characters, such as numbers and/or letters, that may be used to identify a subscriber and the subscriber's operating network. The IMSI and/or ICCID or portions thereof may be used to identify a group to which source wireless device 405 and/or destination wireless device 420 may belong, which will be described in more detail below.

Group identifiers 415 and 430 may also include one or more electronic tags such as a Radio Frequency Identification (RFID) tag, or the like. The RFID tag may include data corresponding to a group to which source wireless device 405 and/or destination wireless device 420 may belong. The RFID tag may include an RFID chip attached to an antenna. According to one embodiment, the RFID tag may be embedded into a removable housing unit or faceplate that may be attached to source wireless device 405 and/or destination wireless device 420. The RFID tag may be scanned by a RFID reader in source wireless device 405 and/or destination wireless device 420 such that the reader identifies the RFID tag. Source wireless device 405 and/or destination wireless device 420 may store the data scanned from the RFID tag. To subscribe to different groups, a subscriber may purchase a different removable housing unit or units with different group identification symbols that have unique RFID tags embedded therein. Any portion of the data scanned from the RFID tag may be used to identify a group to which source wireless device 405 and/or destination wireless device 420 may belong, which will be described in more detail below.

According to one embodiment, group identifiers 415 and 430 may also include wireless device digits such as a block of digits corresponding to wireless device telephone numbers. For example, a group such as a global category may be identified by the telephone numbers ending in the 5000-5100 block. A sub-category or sub-group to the global category may be identified by the last digit being even or odd in a particular block, for example. Additionally, a group may correspond to a predetermined set of telephone numbers assigned to wireless devices such as source wireless device 405 and destination wireless device 420. For example, group identifiers 415 and 430 may be defined by the telephone numbers to which source wireless device 405 and/or destination wireless device 420 may be assigned.

Additionally, group identifiers 415 and 430 may include hash keys defined by a hashing function, for example. For example, the source network provider may distribute and/or synchronize hash keys to its wireless devices that may define a group or a set of groups to which a wireless device and/or subscriber may belong. The hash keys may be generated using a hashing function that may include an algorithm to convert a variable-sized amount of text into a fixed-sized output. The hash keys may be used to determine whether source wireless device 405 and destination wireless device 420 may belong to the same group, which will be described in more detail below.

Thus, as one skilled in the art would recognize, group identifiers 415 and 430 may include any combination and sequences of characters such as numbers, letters, or the like, such that group identifiers 415 and 430 provide a unique identification for a group to which source wireless device 405 and destination wireless device 420 may belong. Additionally, group identifiers 415 may be stored in the wireless device, may be part of a removable housing unit or face plate that may be read by the wireless device, and/or may be synchronized to the wireless device by the communication network and/or network provider.

In accordance with one embodiment, source wireless device 405 may communicate with source communication network 435. As described above, source communication network 435 may be any type of communication network including the example network described in FIGS. 1A-1C, for example. Source communication network 435 may be operated by a source network provider. The source network provider may offer bandwidth and/or network access to its subscribers such that its subscribers may communicate with each other and subscribers of other networks.

To communicate with other wireless devices, source wireless device 405 may be granted access to communicate with source communication network 435. According to an example embodiment, access may be granted if a user of source wireless device 405 subscribes to a rate plan through the source network provider that operates source communication network 435. For example, the subscriber may pay a monthly fee for a particular rate plan. The rate plan may include a maximum amount of usage per month. The usage per month may include a set number of voice or calling minutes, text messages, instant messages, email messages, multimedia messages, video messages, or the like. Any usage over the maximum amount may establish an overcharge that may be paid to the network provider, for example.

Source communication network 435 may include group billing component 440. Group billing component 440 may be implemented using a variety of techniques with suitable hardware and/or software. For example, group billing component 440 may include hardware components, including, but not limited to, servers, databases, microchips, storage devices, processors, programmed modules, or the like and/or software, including but not limited to, operating systems, database management systems, or the like. Group billing component 440 may include any other suitable components in any combination thereof, such that group billing component 440 may output a usage fee that includes minute charges, text messaging fees, or the like for communications with members outside of one or more groups source wireless device 405 may belong to, which will be described in more detail below.

In accordance with an example embodiment, destination wireless device 420 may communicate with destination communication network 445. As described above, destination communication network 445 may be any type of communication network including the example network described in FIGS. 1A-1C, for example. Destination communication network 445 may be operated by a destination network provider. The destination network provider may offer bandwidth and/or network access to its subscribers such that its subscribers may communicate with each other and subscribers of other networks. According to one embodiment, the destination network provider may be a different network provider than the source network provider.

Destination communication network 445 may be in operative communication with source communication network 435. Thus, source communication network 435 and destination communication network 445 may enable operative communication, such as phone calls, text messaging, email messaging, instant messaging, multimedia messaging, video messaging, or the like, between source wireless device 405 and destination wireless device 415. It will be appreciated that destination communication network 445 may also include a group billing component such as group billing component 440 illustrated as part of source communication network 435.

Figure 2B:
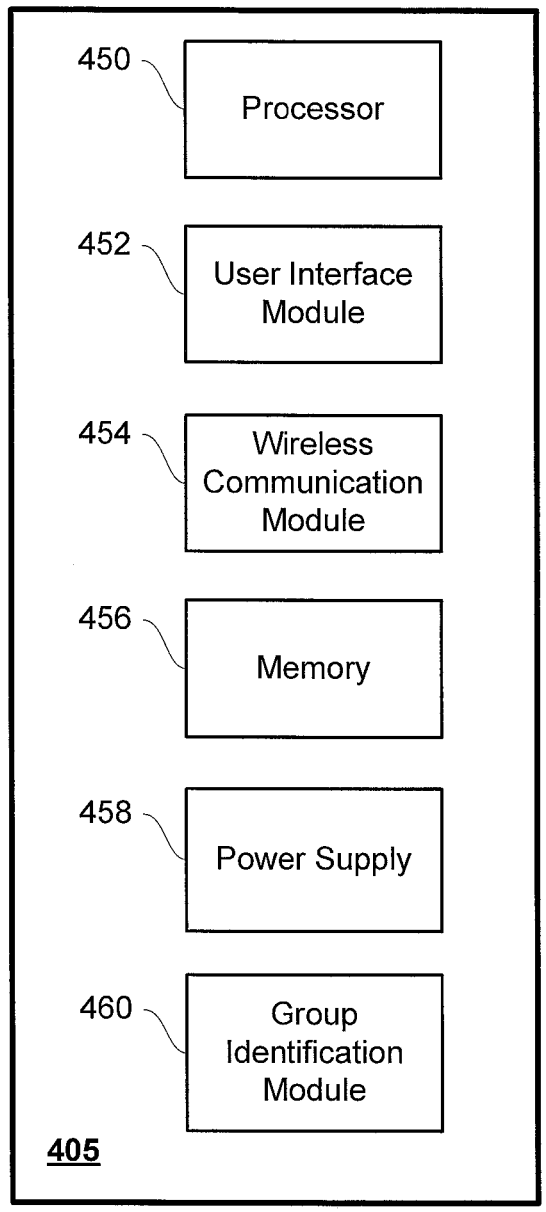
FIG. 2B illustrates an example wireless device that may be used in connection with one embodiment.

FIG. 2B illustrates an example source wireless device 405 that may be used in connection with one embodiment. It will be appreciated that the components and modules of source wireless device 405 illustrated in FIG. 2B are illustrative, and that any number and type of components and/or modules may be present in source wireless device 405. In addition, the functions performed by any or all of the components and modules illustrated in FIG. 2B may be performed by any number of physical components. Thus, it is possible that in some embodiments the functionality of more than one component and/or module illustrated in FIG. 2B may be performed by any number or types of hardware and/or software. It will be appreciated that the same components present in source wireless device 405 may be present in destination wireless device 420 as well.

Processor 450 may be any type of circuitry that performs operations on behalf of source wireless device 405. In one embodiment, processor 450 executes software (i.e., computer readable instructions stored in a computer readable medium) that includes group identification functionality. Such software may be a part of, may include, or may access, for example, group identification module 460, to be discussed below. User interface module 452 may be any type or combination of hardware and/or software that enables a user to operate and interact with source wireless device 405. For example, user interface module 452 may include a display, physical and "soft" keys, voice recognition software, microphone, speaker and the like. Wireless communication module 454 may be any type or combination of hardware and/or software that enables source wireless device 405 to communicate with source communication network 435. Memory 456 enables source wireless device 405 to store information, such as group identifier 415 and the like. Memory 456 may take any form, such as internal random access memory (RAM), an SD card, a microSD card and the like. Power supply 125 may be a battery or other type of power input (e.g., a charging cable that is connected to an electrical outlet, etc.) that is capable of powering source wireless device 405.

Group identification module 460 may be any type or combination of hardware and/or software that enables source wireless device 405 to receive group information such as group identifier 415 and the like. As noted above, group identification module 460 may also include (or may be a part of) group identification software that enables source wireless device 405 to provide group identifications.

In one embodiment, group identification module 460 may include a storage component or a slot or receptacle that may receive a storage card that may store group identifier 415. For example, group identification module 460 may include a slot or receptacle that may accept a SIM card that includes a group identifier such as an IMSI, as described above. Additionally, group identification module 460 may include a memory component such as Read Only Memory (ROM), Random Access Memory (RAM), storage modules, or the like that may be inserted into source wireless device 405. The digital representation of group identifier 415 such as the IMEI, the hash key, the block of digits, or the like may be programmed and stored in the memory component, for example.

Group identification module 460 may also include a scanner, an RFID reader, or the like. For example, if group identifier 415 includes data stored in an RFID tag, group identification module 460 may include an RFID reader. The RFID reader may include a transmitter/receiver that may read the data associated with the RFID tag. Group identification module 460 may also store group identifier 415 that corresponds to the data scanned from the RFID tag by the RFID reader. Alternatively, memory 456 may store group identifier 415 that may include the data scanned by group identification module 460.

Upon initiation of a call, processor 450 may access group identification module 460 and/or memory 456. Processor 450 may then transmit group identifier 415 stored therein to source communication network 435. Source communication network 435 may include a billing component that may be used to determine whether destination wireless device 420 is a member of a group corresponding to group identifier 415 provided by source wireless device 405.

Although not illustrated in FIG. 2B, source wireless device 405 may include additional features and/or components with any combination thereof, such as additional suitable hardware and/or software to receive, store, and/or provide group identifier 415 to source communication network 435 and group billing component 440 illustrated in FIG. 2A.

Figure 2C:
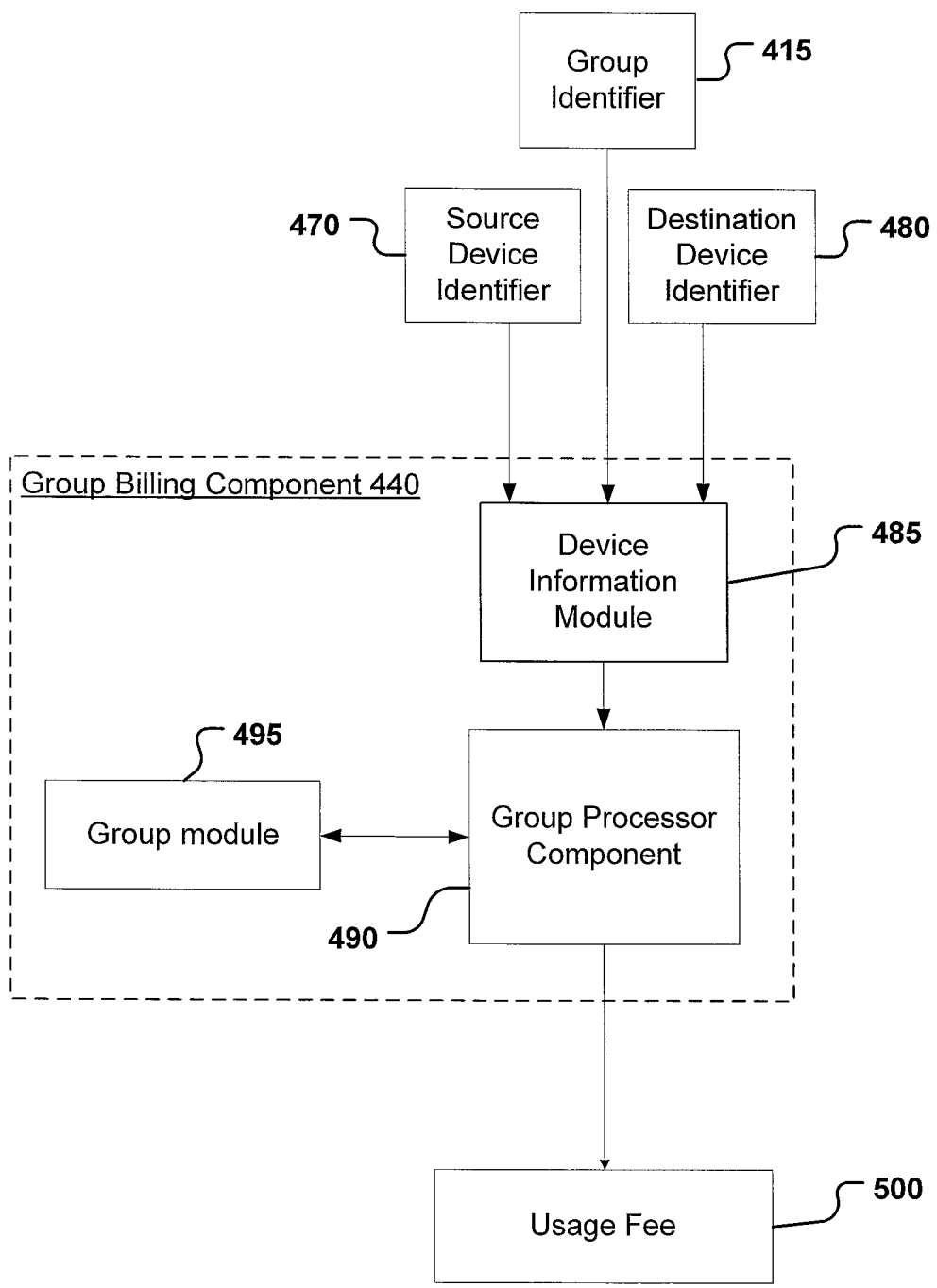
FIG. 2C illustrates an example configuration of a group billing component that may be used in connection with one embodiment.

FIG. 2C illustrates an example configuration of group billing component 440 that may be used in connection with one embodiment. Group billing component 440 may be implemented as an independent component that may be in operative communication with other components of source operating network 435, such as the MSC, the HLR, or the like described in FIGS. 1A-1C. Alternatively, group billing component 440 may be implemented as a component within the MSC, the HLR, or the like as described above in FIGS. 1A-1C. For example, group billing component 440 may be a feature that may be added to HLR 274 depicted in FIG. 1B. Thus, HLR 274 may receive the appropriate information from source wireless device 405 and then route that information to group billing component 440. Additionally, the functionality of group billing component 440 may be performed by any suitable hardware and/or software or any combination thereof within HLR 274, for example.

Group billing component 440 may be implemented using a variety of techniques and hardware components including, but not limited to, servers, databases, microchips, storage devices, processors, or programmed modules. Furthermore, as described above, group billing component 440 may be implemented as an independent component of source wireless network 435, as a separate component within existing components in source wireless network 435, and/or using existing components within source wireless network 435.

As shown in FIG. 2C, group billing component 440 may include device information module 485. Device information module 485 may store group identifier 415, source device identifier 470, and destination device identifier 480 received from source wireless device 405, for example. Device information module 485 may include, for example, RAM memory chips, registers, hard drives, or any suitable hardware designed to store data. Device information module 485 may be in operative communication with source communication network 435, shown in FIG. 2A, such that device information module 485 may receive group identifier 415, source device identifier 470, and destination device identifier 480 from source wireless device 405. Source device identifier 470 may include the telephone number from the source wireless device that initiated the communication, the account number associated with a subscriber stored in the SIM card, or the like. Destination device identifier 480 may include the telephone number, or any other unique identifier associated with destination wireless device 420, shown in FIG. 2A, for example. As described above, group identifier 415 may include digital or electronic information to identify a group to which source wireless device 405 may belong including, but not limited to, the IMEI of source wireless device 405, the IMSI corresponding to the subscriber using source wireless device 405, a block of telephone digits of source wireless device 405, data associated with an RFID tag that may be embedded within source wireless device 405, a hash key stored in source wireless device 405, or the like.

Group billing component 440 may further include group module 495. According to one embodiment, group module 495 may be adapted to store information for determining whether source wireless device 405 may be communicating with another wireless device in the same group. For example, group module 495 may include a database, RAM memory chips, registers, hard drives, or any suitable hardware designed to store data. Group module 495 may include one or more group lists. The group lists may be indexed by the group identifier such as group identifier 415, as shown in FIG. 2A. For example, group module 495 may include a database that may include a list of valid destination device identifiers for a particular group. The group list may be implemented as a tree within group module 495 such that the group identifier may be the root of the tree. Alternatively, the group list may be organized as a hierarchy with the group identifier being the top of the hierarchy. Under each group identifier in the tree or hierarchy may be, for example, each destination device identifier that may be a member of that particular group. Thus, group module 495 may include a listing of groups indexed by the group identifier.

Additionally, group module 495 may include a hash table implemented therein. For example, if group identifier 415 includes one or more hash keys, the hash table may receive those keys and determine the appropriate bucket to which the key may correspond. The bucket may correspond to the group to which source wireless device 405 may belong. Additionally, each bucket established in the hash table may include each destination device identifier that may be a member of that particular group.

According to one embodiment, group module 495 may be in operative communication with the HLR, the MSC, or any other components of source wireless network 435, as described above in FIGS. 1A-1C, such that group module 495 may be updated by a subscriber or the network provider to provide additional groups or to provide modifications to an existing group.

Group billing component 440 may also include group processor component 490. Group processor component 490 may be in operative communication with device information module 485 and group module 495, as shown in FIG. 2C. Group processor component 490 may include, for example, a standard processor, a specialized processor, or the like. Group processor component 490 may engage in a billing or usage analysis for a group to which a user or subscriber of source wireless device 405 may belong. According to one embodiment, group processor component 490 may compare destination device identifier 480 stored in device information module 485 with the group list stored in group module 495. If an element such as a valid destination device identifier in the group list matches destination device identifier 480, group processor component 490 may indicate that no usage fee is to be charged against the subscriber's rate plan. But, if group processor component 490 determines that an element in the group list does not match, group processor component 490 may output usage fee 500. Usage fee 500 may be deducted from the available monthly minutes, available text messages, or the like according to the rate plan corresponding to source wireless device 405, shown in FIG. 2A. For example, usage fee 500 may be transmitted to the billing component including the HLR, or any other suitable component such as those described in FIGS. 1A-1C that tracks billing information for source communication network 435, as was shown in FIG. 2A. Once received by the billing component, usage fee 500 may be deducted according to the rate plan.

FIG. 3 depicts an example method of determining whether a source wireless device and a destination wireless device belong to a group according to one embodiment. As shown in FIG. 3A, at 510, a subscriber using a source wireless device may initiate communication with a destination wireless device. For example, a subscriber or user of a source wireless device may be in communication with a source communication network operated by a network provider from which the subscriber purchases a rate plan. The subscriber or user of the source wireless device may place a telephone call and send a text messages, video message, email message, instant message and/or multimedia message to a subscriber or user of another wireless device via the source communication network. The source communication network may be in operative communication with a destination communication network that may be in communication with a destination wireless device. The subscriber or user of the destination wireless device may receive the communication from the source wireless device via the destination communication network.

After initiating communication, at 515, a group billing component may receive a source device identifier, a destination device identifier, and a group identifier from the source wireless device. For example, the group billing component may include a device information module. The device information module may store the group identifier, the source device identifier, and the destination device identifier received from the source wireless device, for example. The device information module may include, for example, RAM memory chips, registers, hard drives, or any suitable hardware designed to store data. The device information module may be in operative communication with the source communication network such that the device information module may receive the group identifier, the source device identifier, and the destination device identifier from the source wireless device. The source device identifier may include the telephone number from the source wireless device that initiated the communication, the account number associated with a subscriber stored in the SIM card, or the like. The destination device identifier may include the telephone number, or any other unique identifier associated with a destination wireless device, for example. Additionally, the group identifier may include digital or electronic information to identify a group to which the source wireless device may belong including, but not limited to, the IMEI of the source wireless device, the IMSI corresponding to the subscriber using the source wireless device, a block of telephone digits of the source wireless device, data associated with an RFID tag that may be embedded within the source wireless device, a hash key stored in source wireless device, or the like.

At 520, the group billing component may retrieve a group list corresponding to the group identifier received from the source wireless device. According to one embodiment, the group billing component may include a group module. The group module may include a database, RAM memory chips, registers, hard drives, or any suitable hardware designed to store data. The group module may include one or more group lists. The group lists may be indexed by the group identifier received at 515. For example, the group module may include a database that may include a list of valid destination device identifiers for a particular group. The group list may be implemented as a tree within the group module, such that, the group identifier may be the root of the tree. Alternatively, the group list may be organized as hierarchy with the group identifier being the top of the hierarchy. Under each group identifier in the tree or hierarchy may be, for example, each destination device identifier that may be a member of that particular group. Thus, the group module may include a listing of groups indexed by the group identifier.

Then, at 525, the group billing component may compare the destination device identifier received from the source wireless device with the group list. The group billing component may include a group processor component in operative communication with the device information module and the group module. The group processor component may include, for example, a standard processor, a specialized processor, or the like. The group processor component may engage in a billing or usage analysis for a group to which a user or subscriber of the source wireless device may belong. According to one embodiment, the group processor component may compare the destination device identifier stored in the device information module with the group list stored in the group module.

At 530, the group billing component may determine whether to output a usage fee based on the comparison at 525. For example, at 535, if the destination device identifier matches an element in the group list, a usage fee may not be incurred for the communication to the destination device. Thus, at 540, a usage fee may not be output from the group billing component, and the subscriber or user of the source wireless device may not be deducted minutes, text messages, email messages, instant messages, video messages, multimedia messages, or the like from the subscriber's available balance that may be determined by the subscriber's rate plan.

If the destination device identifier does not match an element in the group list, at 535, a usage fee may be incurred for the communication to the destination wireless device. Thus, at 545, a usage fee may be output from the group billing component, and the subscriber or user of the source wireless device may incur a deduction from the subscriber's available balance of minutes, text messages, email messages, instant messages, video messages, multimedia messages, or the like.

At 550, the communication between the source wireless device and the destination wireless device may be ended. For example, a phone call may initiated between the source wireless device and the destination wireless device may be terminated, or a text message may be received by the destination device, thus ending the transmission communication.

It will further be appreciated that the systems and methods disclosed herein need not be limited to wireless devices or wireless communication networks. For example, the systems and methods described may be implemented using Local Area Network (LAN) communication systems and/or Voice Over Internet Protocol (VoIP) communication systems.

What is claimed:

1. A method comprising:
receiving a source device identifier that uniquely identifies a source wireless device, a destination device identifier that uniquely identifies destination wireless device, and a group identifier, wherein:
the group identifier comprises a hash key stored on a Radio Frequency Identification tag;
the group identifier is indicative of a group of which the source wireless device and the destination wireless device are members; and
the group identifier corresponds to a physical identification included on the source wireless device and the destination wireless device;
comparing, via a processor, a group list with the source device identifier and the destination device identifier;
determining whether a usage fee is applicable for use of the source wireless device based on the comparison; and
determining that the usage fee is applicable to the source wireless device when no element in the group list matches the destination device identifier.

2. The method of claim 1, further comprising:
initiating a communication with the destination wireless device; and
terminating the communication with the destination wireless device.

3. The method of claim 1, wherein the source device identifier includes the wireless device telephone number corresponding to the source wireless device.

4. The method of claim 1, wherein the destination device identifier includes the wireless device number corresponding to the destination wireless device.

5. The method of claim 1, wherein the group comprises at least one of: a global category, a purpose category, a temporary category, or a sub-category relating to the group indicated by the group identifier.

6. The method of claim 1, wherein the source wireless device communicates with a source communication network and the destination wireless device communicates with a destination communication network, and wherein the source communication network and the destination communication network are operated by different network service providers.

7. The method of claim 1, wherein the usage fee includes a deduction from an available balance provided by a rate plan, and wherein the deduction includes at least one of the following: minutes, text messages, multimedia messages, instant messages, email messages, or video messages.

8. A computer-readable storage medium that is not a propagating signal, the computer-readable medium comprising executable instructions that when executed by a processor cause the processor to effectuate operations comprising:

receiving a source device identifier that uniquely identifies a source wireless device, a destination device identifier that uniquely identifies a destination wireless device, and a group identifier, wherein:
   the group identifier comprises a hash key stored on a Radio Frequency Identification tag;
   the group identifier is indicative of a group of which the source wireless device and the destination wireless device are members; and
   the group identifier corresponds to a physical identification included on the source wireless device and the destination wireless device;
comparing a group list with the source device identifier and the destination device identifier;
determining whether a usage fee is applicable for use of the source wireless device based on the comparison; and
determining that the usage fee is applicable to the source wireless device when no element in the group list matches the destination device identifier.

9. The computer-readable storage medium of claim 8, wherein the source device identifier includes the wireless device number corresponding to the source wireless device.

10. The computer-readable storage medium of claim 8, wherein the destination device identifier includes the wireless device number corresponding to the destination wireless device.

11. The computer-readable storage medium of claim 8, wherein the group includes at least one of the following: a global category, a purpose category, a temporary category, or a sub-category relating to the group indicated by the group identifier.

12. The computer-readable storage medium of claim 8, wherein the source wireless device communicates with a source communication network and the destination wireless device communicates with a destination communication network, and wherein the source communication network and the destination communication network are operated by different network service providers.

13. The computer-readable storage medium of claim 8, wherein the usage fee includes a deduction from an available balance provided by a rate plan, and wherein the deduction includes at least one of the following: minutes, text messages, multimedia messages, instant messages, email messages, or video messages.

14. An apparatus comprising:
a processor;
memory coupled to the processor, the memory comprising executable instructions that when executed by the processor cause the processor to effectuate operations comprising:
   comparing a source device identifier that uniquely identifies a source wireless device and a destination device identifier that uniquely identifies a destination wireless device with a group list;
determining, based on the comparing, whether a usage fee is applicable for use of the source wireless device; and
determining that the usage fee is application to the source wireless device when no element in the group list matches the destination device identifier, wherein: a group identifier that is indicative of a group of which the source wireless device and the destination wireless device are members comprises a hash key stored on a Radio Frequency Identification tag; and
   the group identifier corresponds to a physical identification included on the source wireless device and the destination wireless device.

15. The apparatus of claim 14, wherein:
the source wireless device communicates with a source communication network;
the destination wireless device communicates with a destination communication network; and
the source communication network and the destination communication network are operated by different network service providers.

16. The apparatus of claim 14, wherein:
the usage fee includes a deduction from an available balance provided by a rate plan, and wherein the deduction includes at least one of the following: minutes, text messages, multimedia messages, instant messages, email messages, or video messages.

17. The apparatus of claim 14, further comprising a housing unit that includes a group identification symbol, wherein the group identification symbol is a visual representation of the group of wireless devices to which the wireless device is a member, and wherein the housing unit is interchangeable with another housing unit that includes another group identification symbol that is a visual representation of another group of wireless devices.

\* \* \* \* \*